(12) United States Patent
Hagelüken et al.

(10) Patent No.: US 8,101,304 B2
(45) Date of Patent: Jan. 24, 2012

(54) PROCESS FOR THE CONCENTRATION OF NOBLE METALS FROM FLUORINE-CONTAINING FUEL CELL COMPONENTS

(75) Inventors: Christian Hagelüken, Hanau (DE); Bernd Kayser, Munich (DE); José-Manuel Romero-Ojeda, Hanau (DE); Ingo Kleinwächter, Hanau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 395 days.

(21) Appl. No.: 10/557,233

(22) PCT Filed: May 17, 2004

(86) PCT No.: PCT/EP2004/005289
§ 371 (c)(1),
(2), (4) Date: Nov. 15, 2005

(87) PCT Pub. No.: WO2004/102711
PCT Pub. Date: Nov. 25, 2004

(65) Prior Publication Data
US 2006/0275652 A1 Dec. 7, 2006

(30) Foreign Application Priority Data
May 16, 2003 (EP) .................................... 03011018

(51) Int. Cl.
*H01M 8/00* (2006.01)
(52) U.S. Cl. ..... 429/400; 429/487; 429/408; 423/213.2; 423/213.5; 423/237; 423/247; 423/213.7; 502/328; 502/159; 502/337; 502/217; 502/326; 422/171; 422/183; 422/177
(58) Field of Classification Search ........................ None
See application file for complete search history.

(56) References Cited

U.S. PATENT DOCUMENTS
3,899,322 A * 8/1975 Yosim et al. ................... 75/402
5,133,843 A 7/1992 Eisman
5,972,531 A 10/1999 Kawakami FOREIGN PATENT DOCUMENTS
| EP | 0854530 | | 7/1997 |
|----|---------|---|--------|
| GB | 2092618 A | * | 8/1982 |
| JP | 58 166651 | | 10/1983 |
| JP | 63 166937 | | 7/1988 |
| JP | 63210246 | * | 8/1988 |
| JP | 63166937 | * | 7/1998 |
| JP | 11/288732 | | 10/1999 |

OTHER PUBLICATIONS

KR2003060524, Date: Jul. 2003, Country: Korea (KR); Name:Choi S C et al Classification: C22B 11/00 (abstract in english).*
JP01294884, Kiyota et al, Nov. 1989, "Fluorine-based anion exchange membrane", english translation abstract only.*
International Search Report.
International Preliminary Examination 'Report.

* cited by examiner

*Primary Examiner* — Melvin Mayes
*Assistant Examiner* — Smita Patel
(74) *Attorney, Agent, or Firm* — Levin Santalone LLP; John Santalone

(57) ABSTRACT

The present invention relates to a process for the concentration of noble metals from fluorine-containing components of fuel cells, for example from PEM fuel cell stacks, DMFC fuel cells, catalyst-coated membranes (CCMs), membrane electrode assemblies (MEAs), catalyst pastes, etc. The process is based on an optionally multi-step heat treatment process comprising a combustion and/or a melting process. It allows an inexpensive, simple concentration of noble materials. The hydrogen fluoride formed during the heat treatment of fluorine-containing components is bound by an inorganic additive so that no harmful hydrogen fluoride emissions occur. The process can be used for the recovery of noble metals that are present as components in fuel cells, electrolysis cells, batteries, and the like.

12 Claims, No Drawings

PROCESS FOR THE CONCENTRATION OF NOBLE METALS FROM FLUORINE-CONTAINING FUEL CELL COMPONENTS

FIELD OF INVENTION

The present invention relates to a process for the concentration of noble metals from fluorine-containing components of fuel cells, for example from PEM fuel cells, DMFC fuel cells, catalyst-coated membranes (CCMs), membrane electrode assemblies (EAs) etc. The process allows the concentration of noble metals from fluorine-containing fuel cell components in a heat treatment process without harmful fluorine or hydrogen fluoride emissions, and is used for the recovery of noble metals that are present as components in fuel cells, electrolysis cells, batteries, and the like.

BACKGROUND OF THE INVENTION

Fuel cells convert, physically separated at two electrodes, a fuel and an oxidizing agent to electricity, heat, and water. Hydrogen, methanol or a gas rich in hydrogen can serve as the fuel, oxygen or air can serve as the oxidizing agent. The process of energy conversion in the fuel cell is distinguished by a distinct lack of pollutants and by very high efficiency. For this reason, fuel cells are becoming increasingly important for alternative driving concepts, energy supply systems for buildings, as well as portable applications.

PEM fuel cells are constructed from many fuel cell assemblies stacked on top of each other. They are electrically connected in series to increase the operating voltage. The so-called membrane electrode assembly (MEA) forms the core of a PEM fuel cell. The MEA consists of the proton-conducting membrane (polymer electrolyte or ion membrane), the two gas diffusion layers (GDLs or "backings") on the sides of the membrane and the electrode layers situated between the membrane and the gas diffusion substrates. One of the electrode layers is provided as an anode for the oxidation of hydrogen, and the second electrode layer is provided as a cathode for the reduction of oxygen.

Depending on their specification and field of application, these catalyst components in fuel cell stacks contain considerable amounts of noble metals such as platinum, ruthenium, palladium and others. For example, a 50 kW PEM stack, as it is currently used for portable applications in automobiles, contains about 50 to 100 g of platinum (i.e. about 1 to 2 g of platinum per kW). Therefore, a large-scale introduction of fuel cell technology into automobiles with a large number of units would require considerable amounts of platinum, at least for the first generation of vehicles. Moreover, a recovery process for the noble metals bound in the fuel cell stacks would then have to be provided to secure the noble metal cycle and thus guarantee the noble metal supply.

The fuel cell components that have to be reprocessed in order to recover the noble metals are comprised of various materials.

The polymer electrolyte membrane consists of polymer materials that conduct protons. Hereinafter, these materials will also be briefly referred to as ionometers. Preferably, a tetrafluoroethylene/fluorovinylether copolymer having sulfonic acid groups is used. This material is, for example, distributed by DuPont under the tradename Nafion®. However, other ionomer materials, such as doped sulfonated polyether ketones or doped sulfonated or sulfinated aryl ketones or polybenzimidazoles, can be used as well. Suitable ionomer materials are described by O. Savadogo in "Journal of New Materials for Electrochemical Systems" I, 47-66 (1998). For use in fuel cells, these membranes generally have to have a thickness between 10 and 200 μm.

In addition to the proton-conducting, fluorine-containing polymer (e.g. Nafion®), the electrode layers for the anode and the cathode comprise electrocatalysts, which catalytically promote the corresponding reactions (oxidation of hydrogen and reduction of oxygen, respectively). Metals of the platinum group of the periodic table of the elements are preferably used as catalytically active components. Often, so-called support catalysts are used wherein highly disperse forms of the catalytically active platinum group metals are applied to the surface of a conductive support material, for example carbon black.

Generally, the gas diffusion layers (GDLs) consist of carbon fiber paper or carbon fiber fabric, which are usually rendered hydrophobic by fluorine-containing polymers (PTFE, polytetrafluoroethylene, etc.). They allow easy access of the reaction gases to the reaction layers and good dissipation of the cell current and the water formed.

In the construction of fuel cell stacks, GDLs and MEAs are stacked on top of each other using so-called bipolar plates. Usually, this is done in the following order: End plate—GDL (anode)—CCM—GDL (cathode)—bipolar plate—GDL (anode)—CCM—GDL (cathode)—bipolar plate (etc.)—end plate. Depending on the desired performance range, up to 100 MEAs are stacked on top of each other. The bipolar plates usually consist of conductive carbon, preferably graphite. They comprise milled channels in a specific pattern which provide the gas supply (fuel gas to the anode and air to the cathode) in the stack. In the recovery of noble metals from PEMFC stacks, the bipolar plates can usually be separated from the stack when it is dissembled and recycled. However, there are also processes wherein the entire stack (including the bipolar plates) is subjected to the recovery process.

In addition to large-scale production processes for catalyst-coated membranes (CCMs), for catalyst-coated gas diffusion substrates (CCBs) as well as for membrane electrode assemblies (MEAs), the commercialization of PEM fuel cell technology above all also requires large-scale and efficient processes for the recovery of noble metals from these components. Only the application of such processes and the associated use of noble metals from the secondary cycle will render fuel cell technology economically and ecologically viable. The provision of appropriate recovery processes provides the prerequisite for fuel cell aggregates for mobile, stationary and portable applications to come on the market in high numbers.

Heat treatment processes, in particular pyrometallurgical processes, for the reprocessing and concentration of residual substances ("refuse") containing noble metals have been known for a long time. Shaft furnaces, refining furnaces or converters, electric furnaces (plasma or electric-arc furnaces), as well as gas-heated or electrically heated crucible furnaces are the centerpieces of the processes employed world-wide. The shaft furnace process is suitable in particular for the reprocessing of refuse rich in silver, with lead being used as a collecting metal for the noble metal. In addition to the crude lead containing the noble metal, copper matte and a slag are formed, which contains the non-metallic components of the refuse. Additives such as limestone, magnesium oxide, sand and calcinated pyrite are used to adjust the viscosity of the liquid slag melt (cf. Lüger, Lexikon der Hüttentechnik, Deutsche Verlagsanstalt Stuttgart, 1963, pages 548 to 553).

Furthermore, conventional combustion processes are known for the concentration of noble metals from catalysts. Residues of catalysts having combustible carbon supports (such as e.g. Pd/activated carbon) are burned in gas furnaces and the noble metal-containing ash is reprocessed. Normally, the noble metal concentration after incineration is sufficiently high to allow direct development using wet chemical methods (cf. in this connection C. Hagelüken, *Edelmetalleinsatz und—Recycling in der Katalysatortechnik*, Erzmetall 49, No. 2, pages 122 to 133 (DZA Verlag für Kultur und Wissenschaft, D-04600 Altenburg).

However, there are only few examples in the literature regarding the reprocessing of fuel cell components containing noble metals.

U.S. Pat. No. 5,133,843 suggests a method for reprocessing or "rejuvenating" an ionomer membrane coated with noble metals, which comprises dissolving the noble metals in aqua regia. The ionomer membrane can then be re-used in fuel cells.

JP 11/288732 describes a method for recovering components for fuel cells, wherein the membrane electrode assemblies are treated with a solvent that dissolves the fluorine-containing ionomer or the membrane. The fluorocarbon polymer is thereby separated from metallic catalysts and other insoluble components. A disadvantage of this method is the use of organic solvents which pose problems with respect to combustibility, industrial safety, environmental damage and toxicity. The subsequent reprocessing of the fluorine-containing catalyst components is not described.

It was an object of the invention to provide a process for the concentration of noble metals from fluorine-containing fuel cell components that overcomes the disadvantages described.

This object is achieved by the process according to claim 1. The dependent claims relate to preferred embodiments.

SUMMARY OF THE INVENTION

The process of the present invention is based on a heat treatment process for the concentration of noble metals from fluorine-containing fuel cell components which is carried out in the presence of an inorganic additive.

DETAILED DESCRIPTION OF THE PREFERRED EMBODIMENTS

In the process of the present invention, the heat treatment of the noble metal-containing fuel cell components is carried out in the presence of an inorganic additive wherein the hydrofluoric acid (HF) and the fluoride (F$^-$) resulting from the fluorine-containing components are bound in situ by the inorganic additive. Thus, hydrogen fluoride (HF) emission in the exhausts of the process can be prevented.

It is an advantage of the process according to the present invention that the fluorine-containing product resulting from the binding reaction between the inorganic additive and the fluorine-containing compound can be separated from the material containing noble metal during the subsequent course of the concentration process. Thus, an interference of the fluorine portions with the subsequent noble metal separation step is prevented. The fluorine-containing reaction product can be separated in wet chemical processes, for example, by leaching the noble metals and subsequent filtration or separation, or in melting processes, for example, by slagging and subsequent separation of the molten metal.

It has surprisingly been found that the in situ binding of HF and fluoride during the heat treatment takes place quickly and almost quantitatively even in the presence of only small amounts of inorganic additives, such as for example calcium carbonate (CaCO$_3$).

The addition of the inorganic additive, for example calcium carbonate (CaCO$_3$), causes the formation of a bound form, such as for example calcium fluoride (CaF$_2$) from organically bound fluorine, for example from the perfluorosulfonic acid polymer (Nafion®) used as a membrane material. In this manner, hydrogen fluoride and fluoride is bound in the combustion residue (or in the slag) and is not released into the oven atmosphere or the exhaust In the case of a perfluoroalkyl compound of the type (—CF$_2$—CF$_2$—)$_n$ and a metal oxide MO, the heat treatment process in the presence of inorganic additives according to the present invention can be represented by the following overall equation:

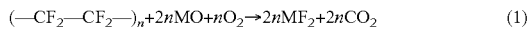

$$(-CF_2-CF_2-)_n + 2nMO + nO_2 \rightarrow 2nMF_2 + 2nCO_2 \qquad (1)$$

M=M$^{2+}$=Mg, Ca, Sr, Ba, etc.

Analogously, this equation can also be applied to substituted perfluorinated compounds, e.g. of the type (—CFR$_1$—CFR$_2$—)$_n$, as used in ionomer membranes. Furthermore, this equation can also analogously be applied to the use of monovalent (M$^+$) or trivalent metals (M$^{3+}$) and other inorganic additives such as carbonates, hydrogen carbonates and hydroxides.

In the concentration process of the present invention, the fluorine portion can be removed in situ from a variety of fluorine-containing components.

Examples of fluorine-containing compounds, formulations and components include
- perfluorosulfonic acid polymers and fluorine-containing ionomer membranes such as Nafion®, Flemion®, Gore-Select®, Aciplex® etc.;
- fully fluorinated polymers such as PTFE®, Hostaflon® or Teflon®;
- dispersions used for rendering GDLs hydrophobic (e.g. aqueous dispersions of Teflon® or Hostaflon®);
- fluorinated copolymers, such as e.g. FEP (a copolymer of tetrafluoroethylene and hexafluoropropylene) or PFA (polytetrafluoroethylene with fully fluorinated alkoxy side chain);
- composite membranes comprising a support fabric of fluorinated polymers (such as for example Gore-select® membranes); and
- partially fluorinated or perfluorinated wetting agents, additives and tensides (e.g. Fluorad®, perfluoroctanoic acid, etc.), which are used in various formulations.

The presence of the inorganic additive almost completely reduces the HF and fluoride emissions; no expensive exhaust purification facility has to be used; the process is inexpensive and can be carried out in simple apparatuses. In order to ensure complete lack of any emissions from the heat treatment facility, simple and inexpensive safety gas washers can be installed.

The heat treatment of the present invention can either comprise a combustion process (for example a pyrolysis process) or a melting process (for example a melt-metallurgical process) or a combination of both processes.

If a combustion process is carried out as the heat treatment, the fluorine-containing reaction product resulting from the inorganic additive and the fluorine of the fluorine-containing fuel cell component (in the case of CaCO$_3$ as the additive, this would be CaF$_2$) remains as a residue, possibly with further inert portions (e.g. unburned residue), and is separated. In a wet-chemical process, separation can for example be carried out by leaching the noble metals and subsequent filtration or separation. However, it can also take place in a subsequent melting process.

Due to its easy handling and high yields, combustion (pyrolysis) is an advantageous heat treatment process for the concentration of noble metals. Combustion processes do not comprise a wet chemical step and therefore do not lead to residues and residual liquids, and they ensure a quick concentration of the noble metal. However, without the addition of the inorganic additive during. combustion, hydrofluoric acid (HF) would form from the organic polymers during the pyrolytical reprocessing of fluorine-containing fuel cell components and composite materials (such as for example PEM stacks, MEAs, GDLs and catalyst-coated ionomer membranes). This gas would then be present in the combustion gases so that an additional purification facility would be required for its removal. Due to its toxicity and corrosive properties, hydrofluoric acid furthermore requires specific safety measures, such as stainless steel pipes, filters and washers. For these reasons, the pyrolytical concentration of noble metals from fluorine-containing fuel cell components has been associated with great technical problems to date.

Furthermore, the fluorine portions would have to be removed from the refuse or solid mixture containing the noble metal because they interfere with the subsequent reprocessing or the noble metal separation step and would lead to a reduction in yield. According to 'the present invention, these disadvantages are avoided by the addition of the inorganic additive.

If a melting process is carried out as the heat treatment, the noble metal-containing material to be concentrated is treated directly together with the inorganic additive in the presence of a noble metal collector (copper, silver, etc.) and optionally other known slag-forming materials in a melting furnace. The inert portions (unburned residues) are slagged together with the fluorine-containing reaction product, i.e. a slag is formed, while molten metal containing noble metals remains.

The molten metal containing noble metals can be further processed by means of wet chemical methods. The conventional methods are known to the person skilled in the art of noble metal separation and are for example described in *Degussa-delmetalltaschenbuch*, $2^{nd}$ edition, pages 36 to 50, (Hüthig-Verlag Heidelberg 1995).

Usually, crucible furnaces, chamber furnaces, tube furnaces or rotary-tube furnaces, which may be electrically heated or gas-heated, are used as ovens for the heat treatment process of the present invention. Combustion takes place under oxidative conditions (air atmosphere), wherein a gas burner is preferably used to ignite the pyrolysis material. A vigorous fire has to be avoided since otherwise noble metal emissions will be present in the exhaust.

If the heat treatment is carried out as part of a melting process, crucible furnaces, converters or rotary drum furnaces can, for example, be used.

Temperatures for the heat treatment are typically between 500 and 1,200° C., and treatment periods of 30 minutes to up to 8 hours are suitable. In special cases, the processes can also be carried out overnight or over several days.

As is the case in the combustion process, the addition of the inorganic additive essentially prevents HF emissions.

Starting materials for the concentration process of the present invention include basically all fluorine-containing components used in membrane fuel cell stacks (PEMFC, DMFC). They include membranes coated with catalyst on one or both sides (so-called "CCMs"),
 catalyst-coated gas diffusion layers (so-called "GDLs"),
 membrane electrode assemblies (MEAs) having gas diffusion layers provided on both sides ("5-layer" MEAs),
 MEAs with or without protective films or seals, and
 5-layer MEAs having integrated bipolar plates (so-called "7-layer" or "9layer" MEAs).

In principle, PEM fuel cell stacks can also be subjected to the process of the present invention after they have been pretreated appropriately. and/or disassembled (dismounted) in a tailored fashion.

Furthermore, fluorine and noble metal-containing waste material from the manufacture of the fuel cell components (such as for example catalyst residues, paste residues, catalyst inks, as well as other precursors or rejects from the manufacture of MEAS, CCMs and GDLs) can also be subjected to the concentration process.

Moreover, intermediate products from the reprocessing of noble metals of catalyst-coated membranes (CCMs) and MEAs, for example separated catalyst layers of CCMs or detached electrode layers, can be processed using the concentration process of the present invention. The membrane component can then be forwarded to the membrane manufacturer for further processing, cleaning and/or reuse.

If desired, the fluorine-containing fuel cell components can be comminuted prior to the heat treatment by means of suitable methods and devices. For instance, chopping processes have proven suitable for comminuting MEAs and CCMs. Jaw breakers and/or hammer mills can be used to comminute MEAs with bipolar plates.

Inorganic compounds of the elements from the first, second and third main groups (groups IA, IIA, IIIA) of the periodic table can be used as additives. Examples include oxides such as $Na_2O$, $K_2O$, $MgO$ or $CaO$; carbonates such as $CaCO_3$ or $MgCO_3$; hydrogen carbonates such as $Ca(HCO_3)_2$ and hydroxides such as $Ca(OH)_2$ or $Al(OH)_3$. Furthermore, nitrates, sulfates, phosphates, hydrogen phosphates, as well as acetates, oxalates and formates of the elements of the first to third main groups can be used as additives. The compounds can be used individually or in admixture as well as in anhydrous or hydrated form. Preferably, carbonates and hydroxides are used as inorganic additives.

The additive is usually added in an amount of up to 100 times in excess, preferably up to 10 times in excess (based on the molar amount of the fluorine to be bound) and after it has been added, it is homogenized with the comminuted material by means of suitable mixing units (e.g. a tumbling mixer).

The following examples are intended to describe the process of the present invention in more detail.

EXAMPLES

Example 1

This example describes the inventive concentration of platinum (Pt) from fluorine and noble metal-containing catalyst residues using the addition of an inorganic additive.

10 g fluorocarbon polymer-containing catalyst mixture are obtained by detaching the electrode layers from catalyst-coated membranes (CCMs). The content of F-polymer is about 19 wt.-%, the content of fluorine (F) is about 15 wt.-%. Thus, the fluorine content is 1.5 g (=0.08 moles F). Furthermore, the mixture contains about 25 wt.-% platinum in the form of a carbon black supported catalyst. 80 g $CaCO_3$ (anhydrous, for synthesis, from Merck) are added; this corresponds to 0.8 moles $CaCO_3$ (10 fold excess, since 1 mole $CaCO_3$=100 g). After the addition, the mixture is mixed vigorously.

The material is heated in a tube furnace to 1000° C. in aluminum oxide boats and then held at this temperature for two hours. During pyrolysis, no fluorine-containing combustion gases are detectable; the pH value in the wash bottle at the end of the process does not show any change and remains neutral (pH=7).

The analysis of the combustion residue shows a $CaF_2$ content of 7.2 wt.-%; in the wash water, the fluoride content is lower than 3 ppm (<3 mg/l).

During additional process steps, the fluorine-containing reaction product, optionally comprising further inert components, is separated from noble metal-containing material. The noble metal-containing material is processed further by means of conventional methods and processes.

Comparative Example 1 (CE 1)

This example describes the recovery of Pt from fluorine-containing catalyst residues without the addition of an inorganic flux.

10 g fluorocarbon polymer-containing catalyst mixture are obtained by detaching the electrode layers from catalyst-coated membranes (CCMs). The content of F-polymer is about 18 wt.-%, the content of fluorine (F) is about 15 wt.-%. Furthermore, the mixture contains about 25 wt.-% platinum in the form of a carbon black supported catalyst. The material is heated in a tube furnace to 1000° C. and then held at this temperature for two hours. During pyrolysis, combustion gases are clearly detectable which are collected in a wash bottle at the end of the process. The analysis of the combustion residue shows a fluorine content of 0.1 wt.-%, the pH value in the wash water clearly drops to an acidic level (pH=2). The fluoride content of the wash water increases to 200 ppm (=200 mg/l). This indicates that considerable hydrogen fluoride (HF) emissions have occurred.

The combustion residue is processed further as described in Example 1.

Example 2

This example describes the recovery of Pt and Ru from catalyst-coated membranes (CCMs) in a two-step heat treatment (combustion and subsequent melting process).

Catalyst-coated membranes (CCMs without GDLs, 50 $cm^2$ active surface, Pt loading 0.5 mg $Pt/cm^2$, Ru loading 0.25 mg $Ru/cm^2$) are finely ground in a chopper. The comminuted material has an F-polymer content of 38 wt.-%, and a fluorine (F) content of about 30 wt.-%. 1.6 moles $CaCO_3$ (=160 g $CaCO_3$) are added to 10 g of the comminuted material (containing about 0.16 moles F). Then the mixture is homogenized in a tumbling mixer.

The heat treatment is carried out in a chamber furnace at 1000° C. and a dwell time of 1 hour with air supply. No hydrogen fluoride is developed in the oven. After the pyrolysis, no fluoride is detectable in the wash water of the exhaust, either. The combustion residue is processed further in a subsequent melting process in a high-temperature furnace, wherein the platinum and the ruthenium are concentrated in the molten metal and the fluorine-containing reaction product ($CaF_2$) is slagged. Then the molten metal is conditioned further using known methods in order to recover the noble metals.

Example 3

This example describes the recovery of Pt and Ru from membrane electrode assemblies (MEAs) in a two-step heat treatment (combustion and subsequent melting process).

Five-layer membrane electrode assemblies (CCMs having two GDLs, 50 $cm^2$ active surface, Pt loading 0.5 mg $Pt/cm^2$, Ru loading 0.25 mg $Ru/cm^2$) are finely ground. 2 moles $CaCO_3$ (=200 g $CaCO_3$) are added to 20 g of the comminuted material. Then the mixture is homogenized in a tumbling mixer.

The heat treatment is carried out in a chamber furnace at 1200° C. for 8 hours with air supply. No hydrogen fluoride develops in the oven. After the pyrolysis, no fluoride is detectable in the wash water of the exhaust, either. The combustion residue is processed further in a subsequent melting process using a high-temperature furnace, wherein the platinum and the ruthenium are concentrated in the molten metal and the fluorine-containing reaction product ($CaF_2$) is slagged.

Then the molten metal is conditioned further using known methods in order to recover the noble metals.

Example 4

This example describes the recovery of Pt and Ru from membrane electrode assemblies (MEAs) in a single-step heat treatment (melting process).

Five-layer membrane electrode assemblies (CCMs having two GDLs, 50 $cm^2$ active surface, Pt loading 0.5 mg $Pt/cm^2$, Ru loading 0.25 mg $Ru/cm^2$) are finely ground. 2 moles $CaCO_3$ (=200 g $CaCO_3$) are added to 20 g of the comminuted material. Then the mixture is homogenized in a tumbling mixer.

The heat treatment is carried out as a melting process in a high-temperature crucible furnace in the presence of a noble metal collector at 1200° C. for 8 hours with air supply. No hydrogen fluoride develops in the oven. After the heat treatment, no fluoride is detectable in the wash water of the exhaust, either. The noble metals platinum and the ruthenium are concentrated in the molten metal and the fluorine-containing reaction product ($CaF_2$) is slagged and withdrawn as a slag together with the other inert material.

Then the molten metal is conditioned further using known methods in order to recover the noble metals.

What is claimed is:

1. A process for the concentration of noble metals from fluorine-containing fuel cell components comprising a heat treatment process in the presence of an inorganic additive,
    wherein the inorganic additive is selected from the group consisting of $Na_2O$, $K_2O$, MgO, CaO, $CaCO_3$, $MgCO_3$, $Ca(HCO_3)_2$, $Ca(OH)_2$, $Al(OH)_3$, and combinations thereof;
    wherein the heat treatment process is conducted
        in one step as a melting process, in which the fuel cell components are treated directly together with the inorganic additive in the presence of a noble metal collector and optionally a slag forming material in a melting furnace;
    wherein the noble metal collector is copper, silver or lead; and
    wherein the heat treatment process is conducted at temperatures between 500 and 1200° C. in the presence of air.

2. The process according to claim 1, wherein the inorganic additive binds the fluorine contained in the fuel cell components during the heat treatment process.

3. The process according to claim 1, wherein the inorganic additive is separated from the noble metal-containing material after the heat treatment process.

4. The process according to claim 1, wherein the inorganic additive is added in an excess of up to 100 fold based on the molar amount of the fluorine to be bound.

5. The process according to claim 1, wherein membranes coated with catalyst on one or both sides, catalyst-coated gas diffusion layers, membrane electrode assemblies having integrated gas diffusion layers, membrane electrode assemblies having integrated seals, membrane electrode assemblies having integrated bipolar plates, separated catalyst layers, electrode layers, catalysts, paste residues, catalyst inks, as well as precursors and/or rejects from the manufacture of membrane electrode assemblies, catalyst-coated membranes and gas diffusion layers, are used as the fluorine-containing fuel cell components.

6. The process according to claim 1, further comprising a comminution process prior to the heat treatment process.

7. The process according to claim 1, further comprising a conditioning process after the heat treatment process in order to obtain a noble metal or a noble metal salt.

8. The process according to claim 7, wherein the conditioning process is a wet chemical process.

9. The process according to claim 1, wherein the inorganic additive is calcium carbonate ($CaCO_3$).

10. The process according to claim 1, wherein the noble metal collector is copper.

11. A process for recovering noble metals from fluorine-containing fuel cell components which comprises concentrating the noble metals by using the process of claim 1 to form a noble metal-containing material and a fluorine-containing reaction product, separating the fluorine-containing reaction product from the noble metal-containing material, and recovering the noble metals from the noble metal-containing material.

12. A process for recovering noble metals from fluorine-containing components of fuel cells, electrolysis cells or batteries which comprises:
  a) concentrating the noble metals by a heat treatment process in the presence of an inorganic additive to form a noble metal-containing material and a fluorine-containing reaction product,
    wherein the inorganic additive is selected from the group consisting of $Na_2O$, $K_2O$, MgO, CaO, $CaCO_3$, $MgCO_3$, $Ca(HCO_3)_2$, $Ca(OH)_2$, $Al(OH)_3$, and combinations thereof; and
    wherein the heat treatment process is conducted in one step as a melting process at temperatures between 500 and 1200° C. in the presence of air, in which components are treated directly together with the inorganic additive in the presence of a noble metal collector and optionally a slag forming material in a melting furnace, wherein the noble metal collector is copper, silver or lead,
  b) separating the fluorine-containing reaction product from the noble metal-containing material, and
  c) recovering the noble metals from the noble metal-containing material.

* * * * *